United States Patent [19]

Bachel et al.

[11] Patent Number: 4,714,277
[45] Date of Patent: Dec. 22, 1987

[54] LONGITUDINALLY DIVIDED SLEEVE OF SHRINKABLE MATERIAL

[75] Inventors: Ernst Bachel, Geltendorf; Wolfgang Giebel, Planegg, both of Fed. Rep. of Germany

[73] Assignee: Siemens Aktiengesellschaft, Berlin and Munich, Fed. Rep. of Germany

[21] Appl. No.: 855,354

[22] Filed: Apr. 24, 1986

[30] Foreign Application Priority Data

Apr. 26, 1985 [DE] Fed. Rep. of Germany ....... 3515242

[51] Int. Cl.⁴ .............................................. F16L 47/00
[52] U.S. Cl. ..................... 285/39; 285/381; 285/419; 285/909; 174/DIG. 8
[58] Field of Search ................. 285/381, 419, 909, 39; 138/128, 162, 99; 174/DIG. 8

[56] References Cited

U.S. PATENT DOCUMENTS

| | | | |
|---|---|---|---|
| 2,558,367 | 6/1951 | Madsen | 138/128 X |
| 2,960,561 | 11/1960 | Plummer | 138/128 X |
| 3,088,495 | 5/1963 | Svec | 138/128 |
| 3,106,941 | 10/1963 | Plummer | 138/128 |
| 3,467,761 | 9/1969 | Plummer | 138/128 |
| 3,517,702 | 6/1970 | Mueller et al. | 138/128 |
| 3,542,077 | 11/1970 | Muchmore | 285/381 X |
| 4,280,258 | 7/1981 | Kunze | |
| 4,388,488 | 6/1983 | Wlcek et al. | 174/DIG. 8 X |
| 4,399,840 | 8/1983 | Lee | 174/DIG. 8 X |
| 4,422,478 | 12/1983 | Pentney et al. | 174/DIG. 8 X |
| 4,442,153 | 4/1984 | Meltsch | |

FOREIGN PATENT DOCUMENTS 1947057 3/1970 Fed. Rep. of Germany .
1225463 3/1971 United Kingdom .

Primary Examiner—Thomas F. Callaghan
Attorney, Agent, or Firm—Hill, Van Santen, Steadman & Simpson

[57] ABSTRACT

A longitudinally divided sleeve of shrinkable material has a lock closure along longitudinal edges. One of the longitudinal edges includes a closure element having a locking groove formed by two longitudinally extending leg portions, a second longitudinal edge being provided with a locking element having a longitudinally extending hook part having a resilient projection which is received in the locking groove to form the lock closure. The resilient projection prevents the accidental removal of the hook part from the locking groove and preferably the material forming the two elements has a higher cross-linking than the remaining portions of the heat-shrinkable sleeve.

11 Claims, 3 Drawing Figures

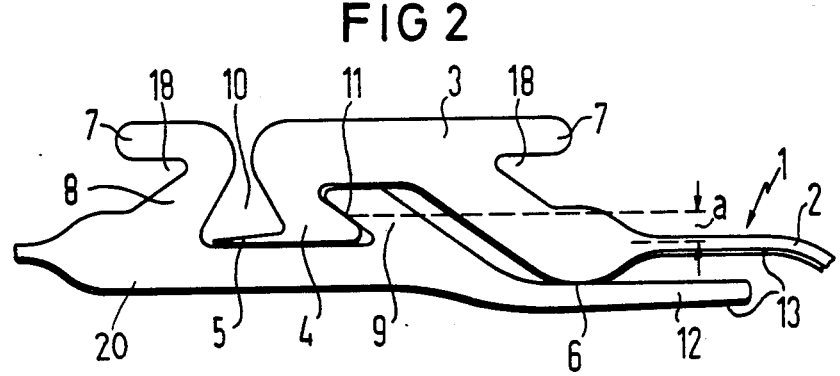
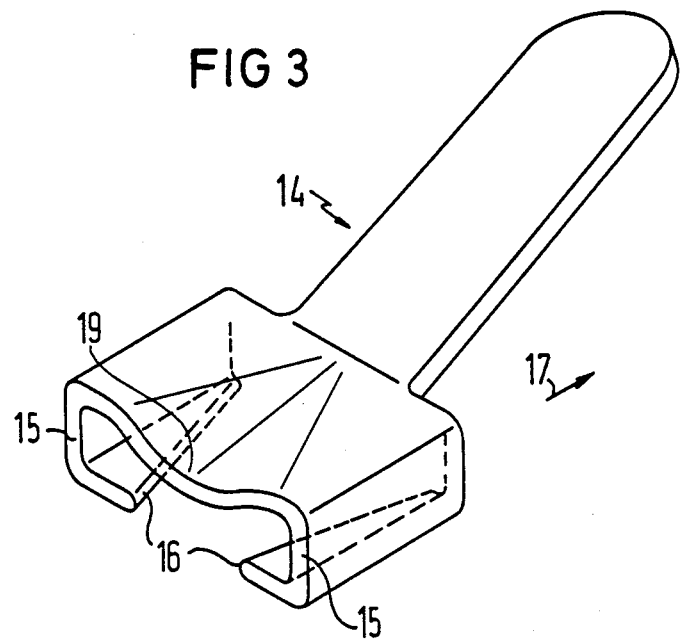

LONGITUDINALLY DIVIDED SLEEVE OF SHRINKABLE MATERIAL

BACKGROUND OF THE INVENTION

The present invention is directed to a longitudinally divided sleeve of shrinkable material comprising a closure element along each of the longitudinal edges to form a lock closure. The lock closure comprises one of the elements having a longitudinal locking groove along one longitudinal edge of the divided sleeve and a second closure element being a lock element which mates with the longitudinal locking groove and is provided along the other longitudinal edge.

A method for covering connections of electrical cables and pipes wherein a cladding, which is shrinkable under an influence of heat, is applied over the location of the connection, is then closed by engaging lock elements along the edges and is finally shrunken down onto the enclosed article is disclosed by German OS No. 1,947,057. The closure elements are composed of a longitudinal groove along one longitudinal edge and of a lock element mating with the groove along the second longitudinal edge. Both elements are arranged so that a bead will project outwardly from the cladding. Particularly given high shrinking forces, this has the disadvantage that the closing region is pulled apart so that a longitudinal gap, which will cause a loss of tightness, can occur. The risk also exists that given high shrinking forces, the closure can become undone again since the lock element is engaged in the groove in the same direction as the forces created by the shrinking which are in a circumferential direction. Moreover, the insertion of the lock element in the groove requires greater closing forces if it is to be guaranteed that the closure is also suitable given greater stressing particularly during the shrinking operation.

SUMMARY OF THE INVENTION

An object of the present invention is to create a closure for a longitudinally divided sleeve which is suitable for high-closing forces and which can nonetheless be closed in a simple and easy way so that the distribution of forces in the closing region is to be designed such that it is torque-free as possible and thus sure to remain closed under the influence of the forces created during a shrinking operation.

This object is achieved with an improvement in a longitudinally divided sleeve of heat-shrinkable material having a lock closure along its longitudinal edges, which lock closure comprises a longitudinal locking groove along one longitudinal edge and a lock element mating with the longitudinal groove being provided along the second longitudinal edge. The improvements are that the closing region formed by the lock closure has a higher degree of cross-linking than the rest of the shrinkable sleeve, that the longitudinal locking groove of the one closure element is formed by two longitudinally extending leg portions which are inclined one toward the other to form a groove having a base or root wider than the mouth of the groove, the lock element along the other side is shaped in the form of a hook shape having an angle of the hook part which is engaged in the longitudinal locking groove matching the angle of inclination of one of the undercut legs forming the groove, the lock element also includes a resilient projection which with the hook is matched to the width of the root or base of the groove and the longitudinal gap of the locking groove is selected such that the lock element of the hook and projection can be forced or squeezed into the longitudinal groove in a locking fashion.

Advantages given the sleeve of the invention particularly occur wherein the latching mechanism can be actuated in a reliable and simple way so that unintentional opening cannot occur. Due to dimensioning of the closure elements, an optimal torque-free closing region is created and this will guarantee a reliable closure even during the critical heat-shrinking operation. In selecting the cross-linking ratio between the shrinking part of the sleeve and the non-shrinking closure region, it is also achieved that the susceptibility to tearing is reduced particularly given large diameters. This ratio is selected so that the closure region stretches within a certain limit given excessive shrinking forces. As a consequence of this stretching, the shrinking force will decrease and the walls of the shrinking part of the sleeve is protected against tears. It is noted that this wall is very thin per se particularly given large diameters. The influencing variables coming into consideration therefore are the thickness of the closure region, the thickness of the hook part, the degree of cross-linking of these elements and the temperature prevailing during the heat-shrinking operation. Within certain limits, the shrinkage factor can also be influenced by these quantities since the closure region is to be viewed as being an expansion member. It is thereby also innocuous that the locking mechanism becomes ineffective as a result of the stretching since at the moment in which the expansion begins in the closure region, the part to be enveloped is already firmly surrounded by the sleeve and is already adequately secured by the hook-like part of the closure elements so that unintentional opening is not possible.

Favorable expansion factors can be obtained for the closure region when the wall thicknesses of the legs of the longitudinal groove are selected in the range of 1 through 1.8 mm and those of the hook part are selected in a range of 2 to 3 mm. It is therefore expedient to select overall cross-linking in the closure region to be two through six times greater than in the stretchable region which is the remaining portion of the sleeve.

BRIEF DESCRIPTION OF THE DRAWINGS

FIG. 2 is an enlarged partial end view showing details of the closure elements of the present invention; and FIG. 3 is a perspective view of a simple closing tool utilized with the closure elements of the present invention.

DESCRIPTION OF THE PREFERRED EMBODIMENTS

Figure 1:
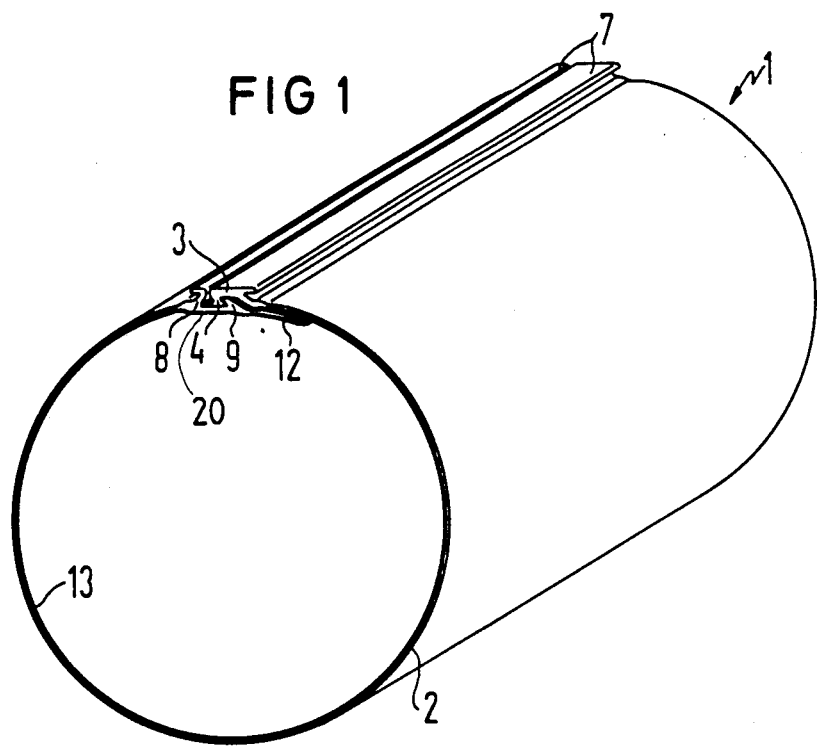
FIG. 1 is a perspective view of the longitudinally divided sleeve in with the present invention while in a closed condition.

The principles of the present invention are particularly useful in a longitudinally divided sleeve of a heat-shrinkable material generally indicated at 1 in FIG. 1. The sleeve 1 has a widened sleeve region 2 which along one edge has a closure or element 3 which has a longitudinally extending hook element 4. Along the opposite edge of the sleeve region 2 is a second closure or lock element 20 which has a pair of longitudinally extending leg portions 8 and 9 which create a locking groove 10 for receiving the hook element 4. The legs 8 of the element 20 and the element 3 each have outwardly extending projections 7 which can be engaged by a tool utilized for closing the closure device.

The element 20 on a free edge is provided with an inside flap 12, which extends underneath the lock element 3 and improves the sealing condition along the longitudinal gap. The inside surface of the sleeve 1 is provided with a coating of a hot-melt adhesive 13 in both the wide sleeve region 2 and in the closure region to form a reliable seal relative to the enveloped article as a result of the heat-meltable adhesive. It should be pointed out that the plastic material employed for the closure region is subjected to a higher cross-linking than the material of the shrinkable sleeve region 2 which is ultimately shrunk onto the articles to be enveloped or enclosed within the sleeve 1. The material for both the sleeve region 2 and the closure region is a thermoplastic material, for example, polyethylene. This material can be cross-linked by various conventional treatments such as by irradiation with various energy of electrons from an electron beam. Also, chemical methods for cross-linking can be used.

The closure region is best illustrated in FIG. 2. As illustrated, the groove 10 has a keyway shape due to the sloping of the legs 8 and 9 toward each other. Thus, the base or root of the groove 10 is wider than the mouth. As mentioned, the legs 8 and 9 slope toward each other with a suitable angle so that undercuts will occur. The lock element 3, which has a bent back but likewise longitudinally proceeding hook part 4, extends at an angle substantially the same as the angle of the surface of the leg 9. The hook part 4, in addition, has a resiliently protruding lip-like projection 5, which has a dimension so that it will fill out the width of the base or root of the groove 10 when the hook part 4 is inserted into the groove 10 to form the closure. The projection or lip 5 thus acts to prevent accidental disengagement of the hook part 4 from the groove.

At its end directed adjacent the shrinkable sleeve region 2, the lock element 3 is provided with a supporting element 6 with which the lock element 3 is supported against an inside flap 12 of the other element 20 after closing. As a result thereof, the force condition in the closed region can be compensated so that the torsions hardly will occur. It is the aim of the invention that the degree of offset "a" between a middle force transfer point 11 on the surface of the hook part 4 and the middle of the wall plane of the region 2 adjacent the supporting element 6 is as low as possible and preferably equal to zero. This would be the ideal case and corresponds to a uniaxial state of stress where no additional torque will deteriorate the sealing or respectively closing conditions acting on the closure region proceeding from the point at which the force is applied. As illustrated, the inner surface of the element 20 including the flap 12 is provided with the coating 13 of the adhesive and also a portion of the lock element 3 is provided with a coating in at least the area of the portion 6.

The longitudinal leg 8 has a greater height than the leg 9 so that the outer surface is substantially in the same plane as the outer surface of the lock element 3. The leg 9 adjacent its outer surface is provided with the longitudinal projection 7 which protrudes laterally and opposite to the projection 7 of the element 3 as illustrated in FIG. 2. These projections 7 respectively form longitudinally extending outside grooves 18 which serve for the guidance of a simple closing tool which has a shape to press the elements 3 and 20 together and press the hook part 4 into the longitudinal groove 10. The closing tool is a simple auxiliary item and facilitates the closing operation particularly given larger and thus stiffer closure elements and long sleeves.

A closure tool is generally indicated at 14 in FIG. 3 and essentially consists of a pair of wedge-shaped pressure elements 16 combined in a U shape which is introduced into the above-mentioned outside grooves 18. By drawing the closing tool 14 in a direction indicated by the arrow 17 along the outside grooves 18 of the closure region, which grooves serve as a guide, the lock element 3 is pressed into the longitudinal groove 10 as a consequence of indentation or depression 19 in the middle region of the tool 14. The spacing of the U-shaped lateral legs 15 corresponds to the spacing of the two outside lateral projections 7 of the closure when in a closed condition.

Although various minor modifications may be suggested by those versed in the art, it should be understood that we wish to embody within the scope of the patent granted hereon, all such modifications as reasonably and properly come within the scope of our contribution to the art.

We claim:

1. In a longitudinally divided sleeve of shrinkable material comprising a lock closure along longitudinal edges, said lock closure comprising one longitudinal locking groove along one edge and one lock element mating with said groove along a second longitudinal edge, the improvements comprising the region of the closure having a higher degree of cross-linking than the remaining shrinkable portions of the sleeve, said longitudinal locking groove along said one longitudinal edge being formed by two longitudinally extending legs inclined toward one another to form the longitudinal locking groove having a narrower mouth than base, said lock element along the second longitudinal edge being provided with a longitudinally hook-shaped part having an angle of inclination matched to the angle of inclination of one of said pair of legs forming the one longitudinal locking groove, said lock element including a resilient projection at its end, said projection protruding along the base of the locking groove and coacting with the hook part to match the width of the base of said locking groove so that when the hook is inserted into the longitudinal locking groove, the resilient projection prevents unintentional removal of the hook part from said groove.

2. In a longitudinally divided sleeve according to claim 1, wherein the inclination of the one leg and the engaged hook part of the lock element is selected so that a middle transfer point of force between the surface of the hook part and leg is positioned so that a closing region of the lock closure is torque-free as possible in the shrunken condition.

3. In a longitudinally divided sleeve according to claim 2, wherein a degree of offset of the middle transfer point and a middle wall plane of the widened sleeve portion adjacent the longitudinal edge is as small as possible.

4. In a longitudinally divided sleeve according to claim 3, wherein said offset is preferably zero.

5. In a longitudinally divided sleeve according to claim 1, wherein the lock closure is expandable at the shrinking temperature.

6. In a longitudinally divided sleeve according to claim 1, wherein the resilient projection of the lock element is fashioned as an elongated lip extending from the hook part.

7. In a longitudinally divided sleeve according to claim 1, wherein the second leg of the pair of legs forming the groove and the lock element each have oppositely projecting second projections on their outer limitations to form outwardly opening grooves.

8. In a longitudinally divided sleeve according to claim 7, said second projections guiding a closing tool having two wedge-shaped parts opening into said outwardly extending grooves, said tool being moved along the elements and having a depression engaging the locking element to press the hook part and resilient projection into said longitudinal locking groove.

9. In a longitudinally divided sleeve according to claim 1, wherein the element of the closure having the longitudinal locking groove has an inside flap extending across the closure region of the second longitudinal edge.

10. In a longitudinally divided sleeve according to claim 9, wherein the inside of the sleeve is coated with an adhesive activated under the application of heat so that said flap will be secured to an inwardly directed surface of the closing element during the heat-shrinking operation.

11. In a longitudinally divided sleeve according to claim 1, wherein the groove is provided in a first closure element and the lock element along the second longitudinal edge is provided in a second closure element and an wherein an inner surface of the first closure element and at least a portion of the second closure element as well as the remaining portion of the sleeve are provided with a coat of an adhesive which is activatable upon the application of the heat during the heat-shrinking operation.

* * * * *